United States Patent
Endoh et al.

(10) Patent No.: US 9,533,380 B2
(45) Date of Patent: Jan. 3, 2017

(54) BONDING MATERIAL AND BONDING METHOD IN WHICH SAID BONDING MATERIAL IS USED

(75) Inventors: Keiichi Endoh, Okayama (JP); Satoru Kurita, Okayama (JP); Minami Nagaoka, Okayama (JP)

(73) Assignee: DOWA ELECTRONICS MATERIALS CO., LTD., Tokyo (JP)

(*) Notice: Subject to any disclaimer, the term of this patent is extended or adjusted under 35 U.S.C. 154(b) by 35 days.

(21) Appl. No.: 14/369,504

(22) PCT Filed: Jan. 20, 2012

(86) PCT No.: PCT/JP2012/051277
§ 371 (c)(1),
(2), (4) Date: Jun. 27, 2014

(87) PCT Pub. No.: WO2013/108408
PCT Pub. Date: Jul. 25, 2013

(65) Prior Publication Data
US 2015/0028085 A1    Jan. 29, 2015

(51) Int. Cl.
*B23K 35/00*  (2006.01)
*B22F 1/00*   (2006.01)
(Continued)

(52) U.S. Cl.
CPC ........... *B23K 35/365* (2013.01); *B22F 1/0014* (2013.01); *B22F 1/0018* (2013.01); *B22F 1/0062* (2013.01);
(Continued)

(58) Field of Classification Search
CPC .................................... B23K 35/0244–35/025
See application file for complete search history.

(56) References Cited

U.S. PATENT DOCUMENTS 7,799,425 B2 * 9/2010 Chikamori ............ B22F 1/0018
                                                   428/403
8,641,929 B2 * 2/2014 Endoh ................... B22F 1/0018
                                                  106/287.23
(Continued)

FOREIGN PATENT DOCUMENTS

CN    1564726 A    1/2005
CN    1676244 A    10/2005
(Continued)

OTHER PUBLICATIONS

International Search Report issued with respect to application No. PCT/2012/051277, mail date is Apr. 3, 2012.
(Continued)

*Primary Examiner* — Devang R Patel
(74) *Attorney, Agent, or Firm* — Greenblum & Bernstein, P.L.C.

(57) ABSTRACT

The occurrence of uneven drying in the center and end of a surface of a bonding layer during a desolvation process of a pre-drying step is reduced to ensure highly reliable bonding without peeling of a bonding surface even after repeated exposure to heat shock after bonding. The bonding material of the present invention to achieve the object contains silver nanoparticles coated with organic substance having 6 or less carbon atoms and having an average primary particle diameter of 10 to 30 nm as main silver particles, silver nanoparticles coated with an organic substance having 6 or less carbon atoms and having an average primary particle diameter of 100 to 200 nm as secondary silver particles, two kinds of solvents having different boiling points, and a dispersant.

8 Claims, 2 Drawing Sheets

(51) Int. Cl.
  *B23K 35/365*  (2006.01)
  *B23K 1/20*    (2006.01)
  *B23K 35/30*   (2006.01)
  *B22F 3/10*    (2006.01)

(52) U.S. Cl.
  CPC ............. *B22F 3/1021* (2013.01); *B23K 1/203* (2013.01); *B23K 35/3006* (2013.01)

(56) References Cited

U.S. PATENT DOCUMENTS

| | | | |
|---|---|---|---|
| 2004/0245648 A1* | 12/2004 | Nagasawa ............. | B22F 1/0022 257/772 |
| 2006/0199008 A1* | 9/2006 | Sato ...................... | B22F 1/0011 428/402 |
| 2007/0012899 A1* | 1/2007 | Lee ......................... | H01G 4/30 252/500 |
| 2007/0051927 A1* | 3/2007 | Itoh ....................... | B22F 1/0003 252/500 |
| 2008/0173398 A1 | 7/2008 | Yasuda et al. | |
| 2011/0042447 A1* | 2/2011 | Komatsu ................ | B22F 1/0018 228/248.1 |
| 2012/0107628 A1* | 5/2012 | Komatsu ............... | B23K 35/025 428/457 |

FOREIGN PATENT DOCUMENTS

| | | | |
|---|---|---|---|
| CN | 1896082 A | | 1/2007 |
| EP | 2067551 A1 | * | 6/2009 |
| JP | 4025839 B2 | | 4/1998 |
| JP | 2007109833 A | * | 4/2007 |
| JP | 2008161907 A | | 7/2008 |
| JP | 2008258147 A | | 10/2008 |
| JP | 2009138243 A | | 6/2009 |
| JP | 2010229544 A | * | 10/2010 |
| JP | 2011021255 A | | 2/2011 |
| JP | 2011-80147 A | | 4/2011 |
| JP | 2011080147 A | | 4/2011 |
| TW | 201041675 A | | 12/2010 |
| WO | 2011007402 A1 | | 1/2011 |
| WO | 2011155615 A1 | | 12/2011 |

OTHER PUBLICATIONS

Written Opinion issued with respect to application No. PCT/2012/051277, mail date is Apr. 3, 2012.
Japanese Office Action issued for application No. 2013-554173, mail date is May 12, 2015.
Chinese Office Action issued with respect to application No. 201280067576.9, mail date Apr. 16, 2015.
Japanese Office Action issued with respect to application No. 2013-554173, mail date is Dec. 15, 2015.

* cited by examiner

BONDING MATERIAL AND BONDING METHOD IN WHICH SAID BONDING MATERIAL IS USED

FIELD

The present invention relates to a bonding material and a bonding method in which the same is used, and in particular a bonding material using silver nanoparticles in bonding of metals.

BACKGROUND

A metal having a smaller particle diameter is known to exhibit physical properties particular to the size. In particular, nano-scale particles may exhibit properties different from those of a bulk material. A material for bonding different substances using metal nanoparticles, in which such properties are used, has been proposed.

On the other hand, when the electronic control of an automobile and an industrial machine is promoted, power consumption increases. Therefore, the operating temperature of a semiconductor used in the inside thereof tends to increase. For this reason, a bonding material that can withstand a high-temperature environment is desired. Conventionally, lead-containing solder that can maintain its strength at high temperature has been used. However, from a recent tendency of reducing the use of lead, the use thereof tends to be restricted.

A temperature at which a bonding portion is exposed during operation may be near the melting point of solder. In this case, a bonding material having a higher melting point is required. However, when a brazing material having a high melting point is used, a bonding method is not facilitated. Therefore, the provision of a bonding material that is capable of bonding at low temperature and has bonding strength even at high temperature, and a bonding method has been desired.

In order to apply a technology that requires the application of pressure to materials to be bonded during bonding, a device capable of applying at least pressure and heat simultaneously is required. This technology somewhat has a problem in versatility. The technology has another problem in which it cannot be used for a material having only a mechanical strength enough not to withstand the application of pressure. Therefore, if a paste (bonding material) that can exhibit appropriate bonding power without application of pressure to the materials to be bonded can be provided, an object to which the technology can be applied is expected to significantly increase.

An atmosphere where a bonded body is formed is an oxidative atmosphere containing oxygen, for example, at least in the air. For this reason, in a bonding portion containing a surface to be bonded and a bonding material, the bonding portion may be oxidized to adversely affect the bonding power. An influence of oxygen on the bonding portion may be remarkable particularly on a fine bonded body. In order to eliminate such an influence, bonding may be performed under an inert atmosphere including nitrogen. If a bonding material that can exhibit sufficient bonding power even under an inert gas atmosphere can be provided, the use field and potential of the bonding material are expected to significantly increase. Therefore, bonding without application of pressure is strongly required.

As a candidate of a bonding method that can meet such requirements, a bonding method using silver nanoparticles, in which bonding can be achieved using no lead at a temperature lower than that of silver of a bulk material, recently receives attention. For example, Patent Literature 1 discloses that a three-metallic-component type composite nanometallic paste that contains three types of metallic component particles of large, medium, and small sizes in terms of specific size, and particularly composite metal nanoparticles as particles of small size, is sintered in an inert gas without application of pressure, to form a compact metal bonding layer having a high bonding strength of 10 MPa or more.

CITATION LIST

Patent Literature

Patent Literature 1: Japanese Patent Application Laid-Open No. 2011-21255
Patent Literature 2: International Publication WO2011-007402

SUMMARY

Technical Problem

A bonding material using nano-scale silver particles is disclosed as described above, but practical results are still small. Therefore, it cannot be said that, in such a bonding material, various problems have been solved like solder. The inventors of the present application have confirmed that the bonding material has a problem in which a bonding portion is peeled by repeated heat shock. This problem is a phenomenon in which the bonding material is repeatedly exposed to a low temperature environment and a high temperature environment to peel the bonding portion even if the bonding strength is sufficient immediately after bonding.

In a peeled cross section at this time, a situation in which a void is generated in a bonding layer formed from silver particles or uneven drying occurs in the center and periphery of a bonding surface is observed. Specifically, a problem that is caused by an ununiform bonding layer is confirmed. Therefore, a bonding material and a bonding method in which a uniform bonding layer can be formed are needed.

In order to uniform a bonding layer, the silver content in a bonding material needs to be increased. In Patent Literature 1, the silver content in the bonding material is 90% or less. The present inventor tried that the content of silver particles in the bonding material was set to 90% by mass or more by the same method as in Patent Literature 1. However, the silver particles aggregated, and the fluidity was lost. As a result, the bonding material could not be applied to a bonding surface.

On the other hand, a bonding material prepared at the same composition ratio as in Patent Literature 2 was peeled in a repeat heat shock test.

Solution to Problem

The present inventors have extensively investigated the problems, and as a result, found a bonding material that can be uniformly applied to a bonding surface even when the silver content is high, and can also withstand repeated heat shock by forming a compact bonding layer, and a bonding method in which the same is used.

Specifically, a bonding material of the present invention contains:

silver nanoparticles coated with an organic substance having 6 or less carbon atoms and having an average primary particle diameter of 10 to 30 nm as main silver particles;

silver nanoparticles coated with an organic substance having 6 or less carbon atoms and having an average primary particle diameter of 100 to 200 nm as secondary silver particles;

two kinds of solvents having different boiling points; and a dispersant.

In the bonding material of the present invention, the total amount of the solvents and the dispersant is 5% by mass or less relative to the whole amount of the bonding material.

In the bonding material of the present invention, the organic substance having 6 or less carbon atoms that coats the main silver particles is hexanoic acid.

In the bonding material of the present invention, the dispersant has a phosphate group.

In the bonding material of the present invention, the secondary silver particles further include submicron silver particles having an average primary particle diameter of 0.3 to 3.0 μm.

In the bonding material of the present invention, the main silver particles are contained in an amount of 10 to 40% by mass relative to the whole amount of the bonding material.

In the bonding material of the present invention, the content ratio of a solvent having a lower boiling point to a solvent having a higher boiling point among the two kinds of solvents is 3:5 to 1:1.

In the bonding material of the present invention, the solvent having a lower boiling point is at least one solvent selected from butanol, octanol, α-pinene, xylene, and acetylacetone, and the solvent having a higher boiling point is at least one solvent selected from dodecanol, 2-ethyl-1,3-hexanediol, diethylene glycol monobutyl ether acetate, dibutyl diglycol, hexyl diglycol, 2-ethylhexyl diglycol, and isobornyl cyclohexanol.

A bonding method of the present invention includes:

a step of applying the above-described bonding material to surfaces to be bonded of materials to be bonded;

a first heating step of retaining the materials to be bonded under an environment of 80 to 120° C. for 30 to 60 minutes without application of pressure to the surfaces to be bonded; and a second heating step of retaining the materials to be bonded under an environment of 250° C. for 30 to 60 minutes.

Advantageous Effects of Invention

When the bonding material and the bonding method of the present invention are adopted, the bonding material that is applied between materials to be bonded is fired without occurrence of void and unevenness. The content of silver particles in the bonding material can be increased to 95% by mass or more. Therefore, a metal paste for bonding (bonding material) that allows the bonding strength to be sufficiently maintained can be obtained. Even if the materials to be bonded using the bonding material of the present invention by the bonding method of the present invention are exposed to repeated heat shock after bonding, a bonding surface cannot be peeled. Therefore, highly reliable bonding can be achieved.

DESCRIPTION OF EMBODIMENTS

In silver nanoparticles used in the present invention, silver nanoparticles having an average primary particle diameter of 10 to 30 nm, and preferably 15 to 25 nm, which is calculated from a transmission electron micrograph, are used as the main silver particles. Silver nanoparticles having an average primary particle diameter of 100 to 200 nm are used as the secondary silver particles. Using the silver nanoparticles having such particle diameters, a paste for bonding that can easily meet a bonding object and a bonding condition can be provided.

This is for the following reasons. Due to the presence of the silver nanoparticles having an average primary particle diameter of 10 to 30 nm, and preferably 15 to 25 nm, which are the main silver particles, properties of the silver nanoparticles, in which the silver particles can be sintered at low temperature as the particles are finer particles, can be sufficiently utilized. However, the bonding material has a feature of shrinkage during sintering when using only the main silver particles because of the finer particles. When large shrinkage occurs during sintering, stress is accumulated on a bonding layer. This is a cause of peeling a bonding surface. When the particle diameter is larger, the shrinkage during sintering reduces. However, when the particle diameter is larger, properties specific to the silver nanoparticles, such as sinterability at low temperature, are impaired.

In order to simultaneously maintain the properties of silver nanoparticles and relax the shrinkage, silver nanoparticles having a particle diameter range of 100 to 200 nm are contained as the secondary silver particles. Thus, disadvantages of the main silver particles are remedied, and composite particles having both advantages of the main silver particles and advantages of the secondary silver particles can be obtained.

The activity on the surface of silver nanoparticles is very high. Therefore, when the surface of the silver nanoparticles is exposed, adjacent particles may be sintered or oxidized in the air. In general, it is known that when the surface of silver nanoparticles is coated with an organic substance such as an organic compound, oxidation and sintering can be suppressed, and the particles can be kept in an independent and stable state. However, when the molecular weight of an organic compound that coats silver nanoparticles is too large, the organic compound is unlikely to be decomposed or vaporized even by certainly heating during use for the bonding material. From the bonding material, a bonding layer is formed on a bonding interface. Therefore, when the organic substance or carbon produced by insufficiently firing the organic substance is left, the bonding strength may decrease. In order to easily remove the carbon, an organic substance having a small number of carbon atoms is preferably used.

In contrast, when the molecular weight of the organic substance is too small, particles are unlikely to be stably present, and cannot be easily handled. From this viewpoint, an organic substance that coats the surface of the silver nanoparticles needs to have a moderate molecular weight. Specifically, the organic substance that coats the surface of the silver nanoparticles needs to have a molecular weight enough to be easily handled, and be a short molecular chain enough to obtain sinterability at low temperature.

An organic substance that coats the surface of silver nanoparticles and can meet these requirements is carboxylic acid. In this case, a bond form of carboxylic acid may be either saturated or unsaturated. When the organic substance has an unsaturated bond in its structure, the organic substance may have a double or triple bond, or an aromatic ring in its structure. In particular, the use of silver nanoparticles coated with an unsaturated fatty acid enhances the bonding strength. Of the fatty acids, carboxylic acid having 6 or less carbon atoms is preferable. Of carboxylic acids, when an organic substance having 6 or less carbon atoms that coats the main silver particles is hexanoic acid, the bonding strength can be further enhanced.

In the present invention, not only silver nanoparticles coated with one kind of organic substance, but also a mixture of silver nanoparticles coated with separate organic substances may be used. For example, a mixture of silver nanoparticles coated with a saturated fatty acid and silver nanoparticles coated with an unsaturated fatty acid may be used. In the bonding material of the present invention, it is also preferable that flowability be imparted by dispersing silver nanoparticles in a polar solvent. When the polar solvent is used, there is an advantage in which the vapor pressure is low and the handling is suitable as compared to a non-polar solvent at the same temperature.

Further, the secondary silver particles may contain submicron-scale silver particles (hereinafter referred to as "submicron silver particles"). As the submicron silver particles, silver particles having an average primary particle diameter of 0.3 to 3.0 μm are used. Herein, the average primary particle diameter is calculated by a laser diffraction method in accordance with the following procedure.

First, 0.3 g of the sample of silver particles is added to 50 mL of isopropyl alcohol, and dispersed for 5 minutes using an ultrasonic cleaner at a power of 50 W. The $D_{50}$ value (cumulative 50% by mass particle diameter) that is measured by the laser diffraction method using a microtrac particle size distribution analyzer (9320-X100 manufactured by Honeywell-NIKKISO Co., Ltd.) is used as the average primary particle diameter of the submicron silver particles.

When as the submicron silver particles, particles having an average primary particle diameter range of 0.3 to 3.0 μm (300 to 3,000 nm), preferably 0.5 to 2.5 μm, and more preferably 0.5 to 2.0 μm are used, a bonded body having a high bonding power can be provided. On the other hand, when submicron silver particles having such a particle size distribution are used, silver nanoparticles including main silver particles having an average primary particle diameter of 10 to 30 nm, and preferably 15 to 25 nm, and secondary silver particles having an average primary particle diameter of 100 to 200 nm, as described above, are likely to be mixed in space parts between the submicron silver particles.

Therefore, the silver nanoparticles are sintered, and the bonding strength can be enhanced. The surface of the submicron silver particles may be coated with an organic substance to improve the dispersibility. The effects of the present invention are not reduced even without coating, and therefore the kind of the organic substance is not limited. However, when a macromolecule is produced by polymerization, the macromolecule is unlikely to be decomposed, and therefore it is not preferable.

In the present invention, a solvent having a lower boiling point (hereinafter also referred to as "low boiling point solvent") and a solvent having a higher boiling point (hereinafter also referred to as "high boiling point solvent") are both a dispersion medium. Here, expression of lower boiling point and higher boiling point is used to distinguish two kinds of solvents. The solvents are each a solvent having a boiling point that falls within a temperature range described below. The dispersion medium is mainly a polar solvent. To the polar solvent, the silver nanoparticles and the submicron silver particles are dispersed. As such a polar solvent, water or an organic solvent having a polar group can be used in a case of the low boiling point solvent, and an organic solvent having a polar group can be used in a case of the high boiling point solvent.

The mass ratio of silver in the bonding material preferably has the following configuration. The mass ratio of the main silver particles including silver nanoparticles having an average primary particle diameter of 10 to 30 nm, and preferably 15 to 25 nm is 10 to 40% by mass relative to the whole amount of the bonding material. The remainder is the secondary silver particles including silver nanoparticles having an average primary particle diameter of 100 to 200 nm, or the secondary silver particles including silver nanoparticles having an average primary particle diameter of 100 to 200 nm and submicron silver particles having an average primary particle diameter of 0.3 to 3.0 μm. When the mass ratio of silver particles falls within this range, space parts between the secondary silver particles are filled with the silver nanoparticles that are the main silver particles. This configuration is preferable since a complex effect in which the properties of silver nanoparticles that promote sintering at low temperature can be maintained and the strength can be increased is obtained.

When the main silver particles and the secondary silver particles are dispersed in a solvent, a dispersant is further added. Silver nanoparticles have a property in which aggregation easily occurs. In particular, when the silver concentration in the bonding material is as high as higher than 95% by mass, the addition of a dispersant allows the main silver particles and the secondary silver particles to be easily mixed, and as a result, promotion of bonding is made possible. As the dispersant used at this time, a dispersant in which decomposition by heat is easy or the amount of ignition residue is small can be suitably used to eliminate an adverse influence on the bonding strength.

It is preferable that as the ratio of dispersant to be added, the total amount of the dispersant and the solvent be 5% by mass or less relative to the whole amount of the bonding material. Further, the dispersant includes an effective dispersant and an ineffective dispersant. The inventors of the present application have confirmed that a dispersant containing phosphorus is effective at this stage.

The bonding material of the present invention is provided mainly in a paste form. This is because when the bonding material has an appropriate viscosity, it can be easily applied to a bonding area. The inventors have investigated that the viscosity adjustment allows a more rigid bonded body to be formed. From results of the investigation, the bonding material of the present invention that has a viscosity at normal temperature of 10 to 250 Pa·s (at 25° C., 5 rpm, and C (cone): 35/2), preferably 100 Pa·s or less, and more preferably 50 Pa·s or less is finally provided.

Hereinafter, a bonding material completed by the present invention will be described in detail.

<Synthesis of Particles>

In the bonding material used in the present invention, silver nanoparticles to which a saturated or unsaturated fatty acid having 6 or less carbon atoms, particularly carboxylic acid, or a derivative thereof is attached or bonded are used. When the bonding material has a configuration in which the surface of the silver nanoparticles is coated with an organic substance, the silver nanoparticles can be stably present without aggregation during drying or dispersing in a polar solvent.

A saturated or unsaturated organic substance having 6 or less carbon atoms functions as a protective agent for the silver nanoparticles. This protective agent has an effect of obtaining stable silver nanoparticles by attaching it to the surface of the silver nanoparticles to inhibit fusion of the particles. To the silver nanoparticles of the present invention, a comparatively short linear fatty acid is suitable. Specifically, the lengths of hexanoic acid, heptanoic acid, octanoic acid, sorbic acid, benzoic acid, salicylic acid, m-hydroxybenzoic acid, p-hydroxybenzoic acid, and adipic acid are particularly preferable.

When the silver nanoparticles are particles coated with such an organic compound, for example, particles coated with hexanoic acid or sorbic acid, the silver nanoparticles can be obtained in a powder state. Therefore, the storage stability is high and the handling are easy even when they are added to other nanoparticles. Accordingly, it is preferable that an organic substance that coats the main silver particles be hexanoic acid.

Next, a method for producing silver nanoparticles used in the present invention will be described. The method for producing silver nanoparticles includes a solution preparing step of preparing a raw material solution and a reducing solution; a temperature increasing step of increasing the temperature; a reaction step of adding the raw material solution to the reducing solution to cause a reaction to proceed, thereby obtaining silver nanoparticles; an aging step of growing the silver particles in the solution; a washing step of repeating filtration, water-washing, and dispersing to remove excess organic compounds; and a drying step of removing a moisture content in the solution by drying.

In the present invention, the solution preparing step of a reducing solution, the reaction step, and the washing step are performed as follows. A reducing solution used in the solution preparing step of a reducing solution includes water, ammonia water, hexanoic acid (or sorbic acid) that is an organic compound, and an aqueous hydrazine hydrate solution. In the reaction step of the silver nanoparticles, an aqueous solution of metal salt, especially nitrate is added to the reducing solution to cause a reaction. In the washing step, a product obtained in the reaction step is washed with water.

As a result of such steps, the silver nanoparticles are stably present even in a polar solvent, and silver nanoparticles having an average primary particle diameter of 10 to 30 nm, and preferably 15 to 25 nm and silver nanoparticles having an average primary particle diameter of 100 to 200 nm are obtained. The ammonia water included in the reducing solution is added to dissolve an acid in water.

In the reaction step of the silver nanoparticles of the present invention, the temperature of the reaction solution in a reaction vessel may be increased to a range of 40° C. to 80° C. to cause a reaction. When the temperature is lower than 40° C., the degree of supersaturation of silver increases, and nucleation is promoted. Therefore, the particle size distribution is likely to be made ununiform, and this is not preferable. When the temperature is higher than 80° C., nucleation is suppressed, but it is difficult to control particle growth. Therefore, large particles and small particles are randomly present. This is not preferable.

In the reaction step of the silver nanoparticles of the present invention, it is preferable that an aqueous solution of metal salt such as nitrate be added at once from the viewpoint of achievement of homogeneous reaction in the solution. If the aqueous solution is not added at once, the solution becomes a heterogeneous system, and nucleation and particle agglomeration may occur simultaneously. As a result, silver nanoparticles having large particle size distribution and ununiform shape may be produced. Therefore, the expression "added at once" means a mode when reaction factors such as the concentration of a reductant or a protective agent (organic compound, etc.), pH, and temperature do not substantially change due to the timing of adding the aqueous solution of metal salt such as nitrate. In other words, if the homogeneous reaction in the solution is achieved, a method of "adding the entire amount at once" is not particularly limited. In a stage of forming the silver nanoparticles, Cu may coexist to adjust the particle form.

A hydrazine hydrate used in the present invention is not particularly limited as long as it is a reductant capable of reducing metal. A reductant other than the hydrazine hydrate, such as hydrazine, an alkaline borohydride ($NaBH_4$, etc.), lithium aluminum hydride ($LiAlH_4$), ascorbic acid, a primary amine, a secondary amine, and a tertiary amine can be used in combination.

After the reaction step and the washing step of the present invention, a step of dispersing the fine particles in a polar solvent is performed. Herein, "dispersion" refers to a state where the fine particles are stably present in the polar solvent. After standing, some of the fine particles may be precipitated. Further, the addition of a dispersant to a dispersion solution facilitates the dispersion of the silver nanoparticles.

By such a step, a composition in which the silver nanoparticles having an average primary particle diameter of 10 to 30 nm, and preferably 15 to 25 nm and the silver nanoparticles having an average primary particle diameter of 100 to 200 nm are dispersed in the polar solvent with the dispersant is obtained.

In the method for producing silver nanoparticles of the present invention and a method for producing a composition containing such silver nanoparticles, as described above, it is preferable that a reaction vessel having a shape and a configuration in which uniformity of stirring can be achieved be used as the reaction vessel. This is because local concentration and pH distribution largely affects the particle size distribution of the silver nanoparticles according to the present invention since the size of the particles to be obtained is very small.

Next, each production step in one embodiment of the method for producing silver nanoparticles of the present invention will be described in accordance with the flow of a reaction.

<Solution Preparing Step>

In this step, two kinds of solutions are prepared. One of the solutions is a solution I (later referred to as a reducing solution) in which a reductive material (reductant) is dissolved, and the other is a solution II (later referred to as a raw material solution) in which a silver salt as a raw material is dissolved. The reducing solution is prepared by dissolving the above-described reductant in pure water, and at the same time, adding an organic compound as a protective agent and ammonia water as a stabilizing agent, and mixing the resultant mixture until uniform. The raw material solution is obtained by dissolving crystals of the silver salt in pure water. In order to promote the dissolution of the protective agent, an addition order may be changed. In order to facilitate the dissolution, the solution may be heated at a temperature lower than that in the reaction step.

<Temperature Increasing Step>

After the respective solutions have been prepared, the temperatures of the solutions are increased to a reaction temperature using a water bath or a heater. At this time, the reducing solution and the raw material solution are heated in the same manner to eliminate a difference of temperature between the solutions. In this case, convection that is caused by the temperature difference can prevent a problem in which mixing at once cannot be performed. An effect of preventing heterogeneous reaction that is caused by the temperature difference is also exhibited. In addition, the uniformity of particles can be kept. Therefore, this is preferable. A target temperature increased at this time (hereinafter referred to as "reaction temperature") falls within a range of 40 to 80° C.

<Reaction Step>

When the temperatures of the solutions reach the target temperature, the raw material solution is added to the reducing solution. In terms of the homogeneity of the reaction, it is preferable that the entire amount be added at a time while care is taken to prevent bumping.

<Aging Step>

After mixing the reaction solution, the mixture is continuously stirred for about 10 to 30 minutes until the growth of the particles is completed. The end point of this reaction is determined by sampling the reaction solution, adding dropwise hydrazine to the sampled reaction solution, and confirming whether or not a reaction of unreduced silver occurs.

<Washing Step>

The obtained slurry is washed by repeatedly performing a known solid-liquid separation method. In the solid-liquid separation method, a method through filter press, a method of forcibly settling particles using a centrifugal separator to perform solid-liquid separation, or the like can be specifically used.

For example, in the case of employing centrifugation, the following procedures are performed. A centrifugation treatment is first performed at 3,000 rpm for 30 minutes. After solid-liquid separation, a supernatant is then drained, pure water is added, and the mixture is dispersed for 10 minutes with an ultrasonic disperser. In the washing step, a step of centrifugation, drainage of supernatant, addition of pure water, and ultrasonic dispersion is repeated several times to remove the excess organic compound that is attached to the particles. At this time, the completion of washing can be confirmed by measuring the conductivity of the supernatant or the drainage.

In the case of employing solid-liquid separation through filter press, the reaction solution is separated, washed with water that flows in a forward direction, and washed with water that flows in a reverse direction. Thus, the organic compound that is attached to the surface of the particles can be removed. At this time, the completion of washing can be confirmed by confirming the conductivity of the supernatant or the drainage in the same manner as described above.

<Drying Step>

The thus obtained solid material (in a cake state) is subjected to a drying step to be converted into a powder state. Thus, nanoparticles can be stored in a stable form over a long period of time. In this drying, a method using lyophilization or vacuum drying, or a known drying method can be employed.

When the drying temperature is too high, the organic compound that coats the surface of metal may be scattered, and the nanoparticles may not be kept as primary particles. Therefore, as a preferred drying process, a drying treatment may be performed at a temperature that is not too high and is equal to or lower than the decomposition temperature of the organic compound that coats the surface of the particles for an extended period of time. One specific example of a drying condition may be a condition of a temperature of 60° C. and a drying time of 12 hours or more in the air.

As the submicron-scale silver particles, commercially available silver particles can be used. For example, submicron-scale silver particles produced using a method described in Japanese Patent No. 4025839 by the present applicant can be used.

<Pasting>

The submicron silver particles and a mass of the silver nanoparticles obtained by the above-discussed method are added to a polar solvent (dispersion medium) to prepare a paste (dispersion solution). In the present invention, the dispersion medium that is the polar solvent necessarily contains two kinds of solvents including a low boiling point solvent and a high boiling point solvent. It is preferable that the content ratio of the solvent having a lower boiling point to the solvent having a higher boiling point among the solvents be 3:5 to 1:1.

As the low boiling point solvent, any substance can be appropriately selected as long as it is a polar solvent that has a boiling point of 100 to 217° C. and can be used as the solvent of the present invention, specifically, water, alcohol, polyol, glycol ether, or other organic compounds. Specific examples of the low boiling point solvent may include one or more solvents selected from pyridine (boiling point: 115.2° C.), ethylene glycol monomethyl ether acetate (boiling point: 145° C.), methoxypropyl acetate (boiling point: 146° C.), ethyl lactate (boiling point: 151 to 155° C.), ethylene glycol monoethyl ether acetate (boiling point: 156° C.), methoxybutyl acetate (boiling point: 171° C.), 1-methylpyrrolidinone (boiling point: 202° C.), γ-butyrolactone (boiling point: 204° C.), diethylene glycol monoethyl ether acetate (boiling point: 217.4° C.), butanol (boiling point: 100° C.), isobutanol (boiling point: 108° C.), pentanol (boiling point: 138° C.), 2-pentanol (118° C.), hexanol (boiling point: 157° C.), 2-hexanol (boiling point: 139° C.), heptanol (boiling point: 176° C.), 2-heptanol (boiling point: 160° C.), 4-heptanol (boiling point: 156° C.), 2-octanol (174° C.), acetylacetone (boiling point: 140° C.), xylene (boiling point: 140° C.), α-pinene (boiling point: 155 to 156° C.), octanol (1-octanol) (boiling point: 194 to 195° C.), methyl glycol (MG) (boiling point: 124.5° C.), methyl diglycol (MDG) (boiling point: 194.0° C.), isopropyl glycol (iPG) (boiling point: 141.8° C.), isopropyl diglycol (iPDG) (boiling point: 207.0° C.), butyl glycol (BG) (boiling point: 171.2° C.), isobutyl glycol (iBG) (boiling point: 160.5° C.), hexyl glycol (HeG) (boiling point: 208.0° C.), allyl glycol (AG) (boiling point: 159.0° C.), methyl propylene glycol (MPG) (boiling point: 121.0° C.), methyl propylene diglycol (MPDG) (boiling point: 187.2° C.), propyl propylene glycol (PFG) (boiling point: 149.8° C.), propyl propylene diglycol (PFDG) (boiling point: 212.0° C.), butyl propylene diglycol (BFG) (boiling point: 170.2° C.), methyl propylene glycol acetate (MFG-AC) (boiling point: 171.0° C.), dimethyl diglycol (DMDG) (boiling point: 162.0° C.), dimethyl triglycol (DMTG) (boiling point: 216.0° C.), methylethyl diglycol (MEDG) (boiling point: 176.0° C.), diethyl diglycol (DEDG) (boiling point: 188.9° C.), and dimethyl propylene diglycol (DMFDG) (boiling point: 171.0° C.).

Among them, as a solvent preferably used as a low boiling point solvent having excellent homogeneous dispersibility of the present invention, one or more solvents selected from butanol (boiling point: 100° C.), acetylacetone (boiling point: 140° C.), xylene (boiling point: 140° C.), α-pinene (boiling point: 155 to 156° C.), and octanol (1-octanol) (boiling point: 194 to 195° C.) can be used.

As the high boiling point solvent, any substance can be appropriately selected as long as it is a polar solvent that has a boiling point of 230 to 320° C. and can be used as the solvent of the present invention, for example, alcohol, polyol, glycol ether, or other organic compounds. Specific examples of the high boiling point solvent may include one or more solvents selected from diethylene glycol monobutyl ether (trade name: butyl carbitol, available from Sankyo Chemical Co., Ltd.) (boiling point: 230.6° C.), phenoxypropanol (boiling point: 243° C.), texanol (boiling point: 255 to 260° C.), 2-ethyl-1,3-hexanediol (trade name: octanediol, available from Kyowa Hakko Chemical Co., Ltd.) (boiling point: 244° C.), diethylene glycol monobutyl ether acetate (trade name: butyl carbitol acetate, available from Union Carbide Chemicals And Plastics Company Inc.) (BCA) (boiling point: 247° C.), dibutyl diglycol (DBDG) (boiling point: 254.6° C.), dodecanol (boiling point: 259° C.), hexyl diglycol (HeDG) (boiling point: 260° C.), 2-ethylhexyl diglycol (EHDG) (boiling point: 272.0° C.), methyl triglycol (MTG) (boiling point: 249.0° C.), methyl polyglycol (MPG) (boiling point: 295.0° C.), butyl diglycol (BDG) (boiling point: 230.6° C.), butyl triglycol (BTG) (boiling point: 271.2° C.), phenyl glycol (PhG) (boiling point: 244.7° C.), phenyl diglycol (PhDG) (boiling point: 283.0° C.), benzyl glycol (BzG) (boiling point: 256.0° C.), benzyl diglycol (BzDG) (boiling point: 302.0° C.), butyl diglycol acetate (BDG-AC) (boiling point: 246.8° C.), methyl propylene triglycol (MFTG) (boiling point: 242.4° C.), butyl propylene diglycol (BFDG) (boiling point: 230.6° C.), butyl propylene triglycol (BFTG) (boiling point: 274° C.), phenyl propylene glycol (PhFG) (boiling point: 242.7° C.), and isobornyl cyclohexanol (trade name: Terusolve MTPH, available from Nippon Terpene Chemicals, Inc.) (boiling point: 318.3° C.).

Among them, as a solvent preferably used as a high boiling point solvent having excellent homogeneous dispersibility of the present invention, one or more solvents selected from 2-ethyl-1,3-hexanediol (trade name: octanediol) (boiling point: 244° C.), diethylene glycol monobutyl ether acetate (trade name: butyl carbitol acetate) (BCA) (boiling point: 247° C.), dibutyl diglycol (DBDG) (boiling point: 254.6° C.), dodecanol (boiling point: 259° C.), hexyl diglycol (HeDG) (boiling point: 260° C.), 2-ethylhexyl diglycol (EHDG) (boiling point: 272.0° C.), and isobornyl cyclohexanol (trade name: Terusolve MTPH) (boiling point: 318.3° C.) can be used.

Since the silver nanoparticles of the present invention are very small, the particles tend to be aggregated. In order to disperse the particles, a dispersant is added. Any commercial general-purpose dispersant may be used as long as it has an affinity for the particle surface and an affinity for the dispersion medium. Not only one kind of dispersant but also a plurality of kinds of dispersants may be used in combination.

Examples of a dispersant having such properties may include various kinds of dispersants. A dispersant having a carboxyl group, which has been conventionally used, may be also used. When the total amount of the solvent and the dispersant is about 8% by mass relative to the whole amount of the bonding material, a good bonding layer that has a uniform in-plane film density can be obtained and in the bonding layer, silver particles are uniformly dispersed. When the total amount of the solvent and the dispersant is 5% by mass or less relative to the whole amount of the bonding material, a bonding material containing a higher concentration of silver does not have sufficient dispersing power. Therefore, silver particles are aggregated and ununiformly dispersed to produce a bonding layer of which the in-plane film density is ununiform.

In the present invention, a dispersant having a phosphate group is used to enhance the dispersing power, and as a result, the particle density can increase. Therefore, even when the total amount of the solvent and the dispersant relative to the whole amount of the bonding material is adjusted to 5% by mass or less to produce a bonding material containing a higher concentration of silver, a good bonding layer in which silver particles are uniformly dispersed and of which the in-plane film density is uniform can be obtained. Thus, the object of the present invention can be achieved.

Examples of the dispersant having a phosphate group may include as follows: a low molecular weight anionic compound such as a phosphate salt, alkylphosphate, alkyl ether phosphate, lauryl phosphorate, an alkylphosphic acid salt such as sodium lauryl phosphate, potassium lauryl phosphate, a phosphoric acid (mono or di)alkyl salt, (mono or di)alkylphosphate, a monoalkylphosphate salt (MAP), and an alkylphosphate salt such as a dialkylphosphate salt, and a macromolecular aqueous dispersant typified by a polyester polymeric dispersant having a phosphate group, a polyoxyethylene-alkyl ether-phosphate salt such as a polyoxyethylene alkylphosphate salt, alkyl ether phosphate, an alkylpolyethoxy phosphate salt, polyoxyethylene alkyl ether, and a polyoxyethylene-alkyl phenyl ether phosphate salt such as an alkylphenyl phosphate-polyoxyethylene salt, alkylphenyl ether phosphate, an alkylphenyl-polyethoxy-phosphate salt, and polyoxyethylene-alkylphenyl ether-phosphate. However, a dispersant having a structure other than those exemplified above is not excluded as long as it can be suitably applied to the particles of the present invention.

Specific names of known dispersants are listed below. However, the use of dispersants other than those in the following list is not excluded as long as they have the above-described properties. Examples of alkylphosphate may include GF-199, GF-185, and phosphanol ML-200, which are available from TOHO CHEMICAL INDUSTRY Co., Ltd., and examples of alkyl ether phosphate may include phosphanol ED-200, GB-520, LB-400, LP-700, LS-500, ML-220, ML-240, RA-600, RB-410, RD-510Y, RD-720, RD-720N, RL-210, RL-310, RP-710, RS-410, RS-610, RS-710, which are available from TOHO CHEMICAL INDUSTRY Co., Ltd., DISPERBYK-110 and DISPERBYK-111, which are available from BYK, and SOLPLUS D540 available from The Lubrizol Corporation.

As the dispersant, a dispersant of which decomposition by heat is easy or in which the amount of ignition residue is small can be suitably used to eliminate the adverse influence on the bonding strength. Among them, a polyester polymeric dispersant having a phosphate group at its terminal is preferable, and examples thereof may include SOLPLUS D540 available from The Lubrizol Corporation.

When the dispersant and an additive such as a solvent are added, it is preferable that the total of the dispersant and the solvent relative to the whole amount of the bonding material be 5% by mass or less. When the addition amount is less than 0.1% by mass, the effect of addition is not obtained, and nanoparticles are aggregated in the solution. Therefore, this is not preferable. When the addition amount is more than 5% by mass, the content of silver particles in the bonding material becomes less than 95% by mass, and the amount of silver particles necessary for achieving the object of the present invention cannot be added. Therefore, the upper limit of the addition amount is suitably 5% by mass.

In preparation of the bonding material using the dispersant, an appropriate mechanical dispersion treatment may be used. Any known method can be used for the mechanical dispersion treatment as long as the particles are not significantly reformed. Specific examples thereof may include a ultrasonic disperser, a disperser, a three-roll mill, a ball mill, a bead mill, a biaxial kneader, and a planetary mixer. These may be used alone or in combination of two or more.

Next, the bonding method in which the bonding material of the present invention is used will be described. The bonding material is applied to a bonding portion at a thickness of about 20 to about 200 μm using various printing methods, for example, a metal mask, a dispenser, or a screen printing method. The bonding material of the present invention becomes silver having a melting point the same as that of a bulk. Therefore, a bonding interface is not necessarily thinned, unlike general adhesive and solder. This is because a bonding layer has a hardness that is equal to or more than that of bulk silver.

However, in the bonding material of the present invention, the surface of the silver nanoparticles is coated with or bonded to the organic compound. Therefore, when the organic compound is separated or decomposed, gas is generated. A bonding process in which the bonding material of the present invention is used is as follows. The bonding material is uniformly applied to surfaces to be bonded of objects to be bonded. On the surfaces of the objects to be bonded, a thin film layer for enhancing the wetting property may be formed. The thin film layer may be formed, for example, by plating, vapor depositing, or sputtering.

When this thin film layer is heated, the gas generated by the decomposition of the organic compound in the bonding material may be generated as bubbles. When a bonding layer is formed between the objects to be bonded while these bubbles remain, the strength of the bonding layer reduces. Since such bubbles remain in the bonding layer, many carbons may remain. Conventionally, the objects to be bonded are heated under application of pressure to remove the gas, and a bonding layer in a bulk state is formed between the objects to be bonded.

The bonding layer in a bulk state exerts high adhesion and bonding strength. In the present invention, in spite of bonding without application of pressure in which this pressure is eliminated, high adhesion and bonding strength can be exerted. In a bonding method without application of pressure, the gas generated in the bonding material cannot be removed by the application of pressure, unlike the method described above. In addition, residual stress is generated by no application of pressure, and thus, the silver film density in the bonding surface of the bonding layer tends to be made ununiform.

In the present invention, the optimum conditions of a dispersant, a solvent, and a heating condition are appropriately selected and adjusted so that a void due to such bubbles left in the bonding layer is not generated or the residual stress is not generated. Thus, a bonding method without application of pressure that can exert high adhesion and bonding strength can be achieved.

In the bonding method of the present invention, a first heating step is performed. This is a preheating step for vaporization of the solvent in the bonding material in a paste state. However, the organic compound on the surface of the silver nanoparticles may also be decomposed and sintered. Therefore, a temperature equal to or lower than the decomposition temperature is suitable. The decomposition temperature itself of the organic compound can be easily confirmed by thermogravimetry (TG). Therefore, it is desirable that the decomposition temperature be measured in advance.

In a step of preheating silver nanoparticles, heating is performed at a temperature equal to or lower than the sintering temperature of silver particles. Specifically, heating is preferably performed in an environment of 80 to 120° C. The retention time is 30 to 60 minutes. In the first heating step, heating is performed without application of pressure in which pressure is not applied.

In the present invention, the generation of avoid in a bonding layer between bonding surfaces is prevented. For this reason, the content of the solvent is reduced. Further, the solvent includes two kinds of solvents having different boiling points. In the bonding method of the present invention, the bonding material prepared as described above is pre-dried at a temperature at which the silver nanoparticles are not sintered (about 100° C.). By this pre-drying, the low boiling point solvent is slowly vaporized and then removed from the bonding material. At this time, the high boiling point solvent is still present. Therefore, even when the low boiling point solvent is removed from the bonding material, the flowability can be maintained. Accordingly, the volume of vehicle components (dispersant and solvent) in the bonding material decreases, and the distance between the particles decreases to suppress formation of a void.

In a next main firing step, heating is performed at a temperature higher than the sintering temperature of silver. The temperature at this time is a temperature sufficient to vaporize the high boiling point solvent. Therefore, the high boiling point solvent is vaporized from the side face of a bonding portion. However, the solvent moves from the central portion of the bonding surface toward the end of the bonding surface, and thus, the solvent is lost from the center of the bonding surface. Since the bonding material contains the silver nanoparticles, sintering progresses while the solvent is removed, the volume decreases, and the bonding surfaces are attracted to each other from the center of the bonding surface toward the border side. By the attracting, the high boiling point solvent can be removed from the bonding surfaces to form a bonding layer having no void.

In the present invention, the objects to be bonded need not be pressurized during bonding. However, when the objects to be bonded are fixed so that the objects do not move or the objects to be bonded are jointed after application of the bonding material, the objects may lightly be pushed or slightly pressurized by the gravity based on the object own weight. However, such a slight pressure as described above is not referred to as application of pressure in the present invention.

A temperature increasing step may be performed between the first heating step and the main firing step that is a second heating step. The temperature increasing rate at this time preferably falls within a range of 0.01 to 5° C./s.

The main firing step that is the second heating step is then performed. In the second heating step, the bonding material is kept in an environment of 250° C. for 30 to 60 minutes. By the second heating step, the left high boiling point solvent is vaporized. The vaporization behavior of the low boiling point solvent and that of the high boiling point solvent are restricted by separating a heating step into the first and second heating steps, as described above. Thus, the object of the present invention in which a void is not left, the residual stress is not also generated, a high concentration of silver is highly dispersed, and as a result, sufficient bonding strength can be maintained can be achieved.

Next, a method of evaluating the bonding material of the present invention will be described.

<Evaluation of Average Primary Particle Diameter>

Two parts by mass of washed silver nanoparticles are added to a mixed solution of 96 parts by mass of cyclohexane and 2 parts by mass of oleic acid, and dispersed by ultrasonic wave. The dispersion solution is dropped on a Cu microgrid with a support film and then dried to obtain a TEM specimen. The particles on the produced microgrid are observed with a transmission electron microscope (type JEM-100CXMark-II, manufactured by JEOL Ltd.) at an acceleration voltage of 100 kV in a bright field, and an image of the particles is photographed at a magnification of 300,000×.

In calculation of the average primary particle diameter, an image analysis software (A-zou kun (registered trademark) manufactured by Asahi Kasei Engineering Corporation) is used. This image analysis software discriminates individual particles based on the light and shade of color. Circular particle analysis is performed on the 300,000×TEM image under conditions of "brightness of particle" of "dark," "noise removal filter" of "presence," "circular threshold value" of "20," and "overlapping degree" of "50," to measure 200 or more particles as the primary particles, and determine the number average diameter. When many aggregated particles or deformed particles are present in the TEM image, this is considered to be unmeasurable.

<Evaluation of Bonding Strength>

The bonding strength is evaluated according to a method described in JISZ-03918-5:2003 "Test methods for lead-free solders-Part 5: Methods for tensile tests and shear tests on solder joints." In this method, an object to be bonded by die bonding is pushed in a horizontal direction, and a pushing force at which a bonding surface withstanding the force is eventually broken is measured. As a specimen, a silicon chip of 7-mm square is used. In this Example, the test is performed using a bond tester available from DAGE. The measurement is performed at room temperature, a shear height of 50 μm, and a test rate of 5 mm/min. Using the same bonding material and objects to be bonded, a bonding sample is produced. The bonding strength thereof is measured by the above-described method, and the average bonding strength is calculated. This bonding strength is considered as the bonding strength in the present invention.

<Evaluation by Reliability Test>

A specimen that is the same as in the evaluation of bonding strength is subjected to a 1,000-cycle (at high temperature for 5 minutes and at low temperature for 5 minutes) temperature cycle test in a temperature cycle tank at a temperature range of −55° C. to +150° C. After that, the bonding strength thereof is measured by the method described in the evaluation of bonding strength, and is considered as reliability strength in the present invention.

<Evaluation of Properties of Contained Solvent>

Figure 1:
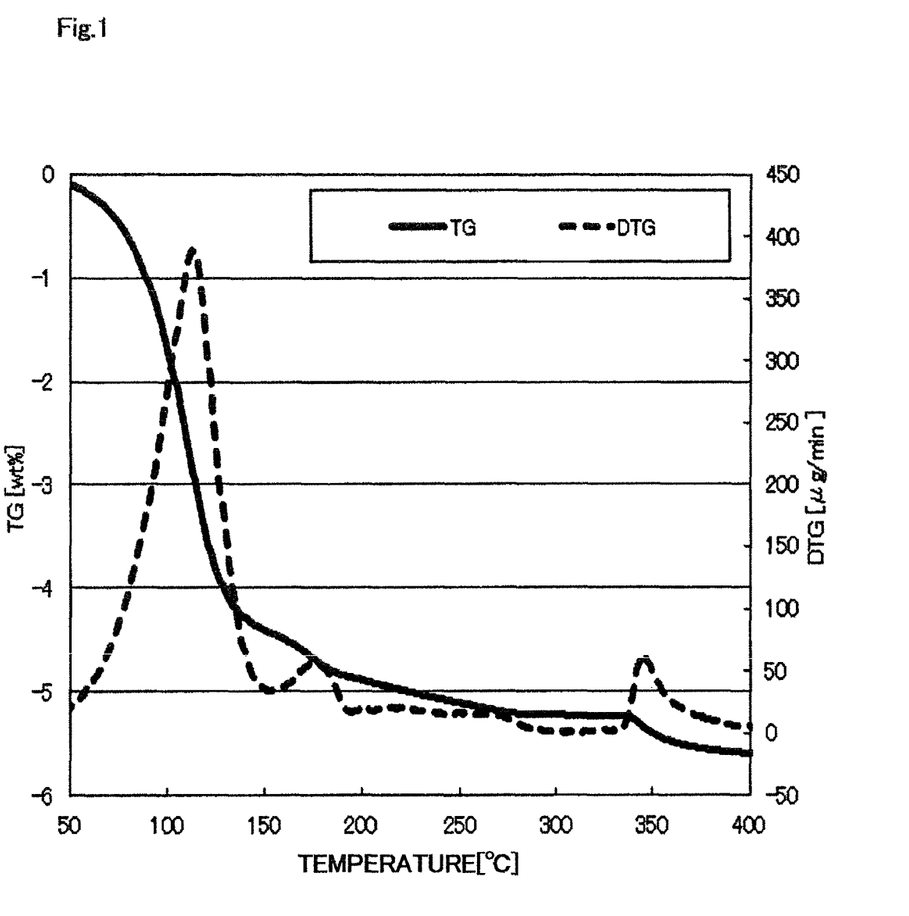
FIG. 1 is a graph showing a result of TG measurement of a bonding material prepared by only a solvent having a lower boiling point.
Figure 2:
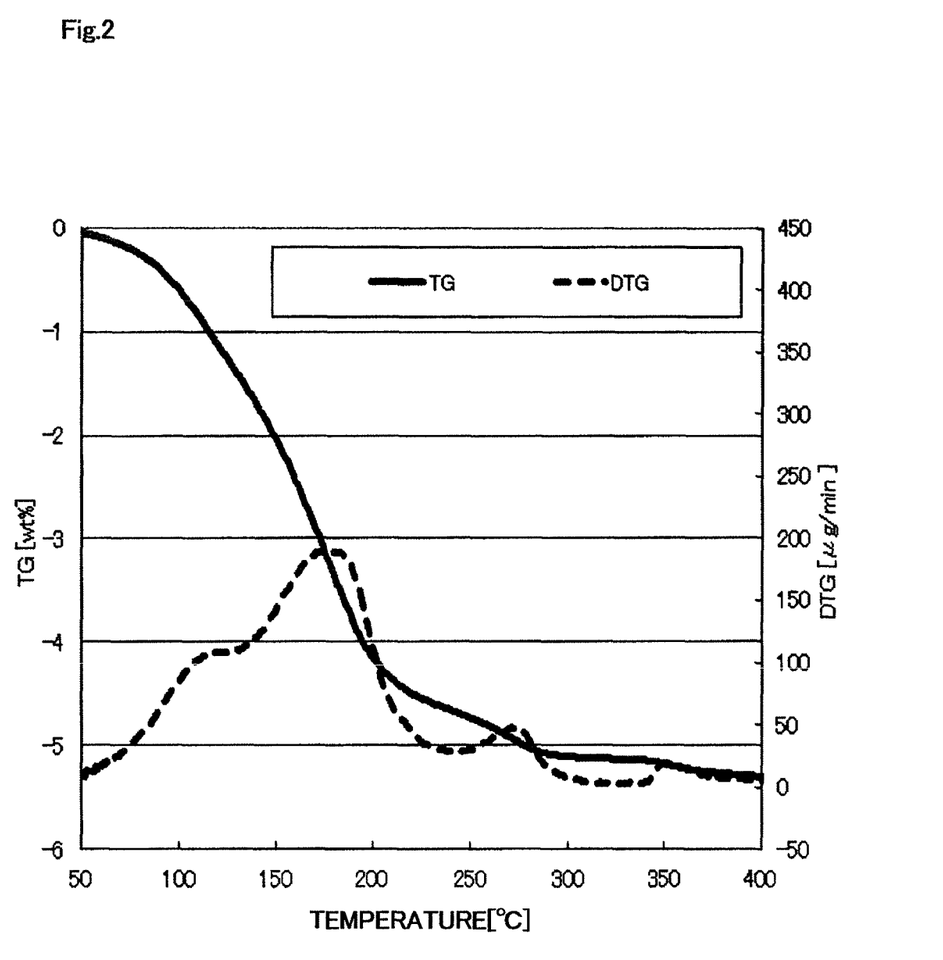
FIG. 2 is a graph showing a result of TG measurement of a bonding material prepared by a mixed solvent of a solvent having a lower boiling point and a solvent having a higher boiling point.

A bonding material (paste) prepared only by a low boiling point solvent and a bonding material (paste) prepared by a mixture of two kinds of solvents, including a low boiling point solvent and a high boiling point solvent are subjected to TG measurement. FIG. 1 shows a TG curve that is a result of TG measurement of the bonding material (paste) prepared by a low boiling point solvent alone and FIG. 2 shows a TG curve that is a result of TG measurement of the bonding material (paste) prepared by a mixture of two kinds of solvents, including a low boiling point solvent and a high boiling point solvent. In FIGS. 1 and 2, the horizontal axis represents temperature (° C.), the left longitudinal axis represents TG (% by weight), and the right longitudinal axis represents DTG (μg/min).

The amount of the specimen to be measured is about 35 mg. The temperature is increased from room temperature to 400° C. at a temperature increasing rate of 10° C./min under a nitrogen atmosphere. In FIGS. 1 and 2, a differential curve of TG (DTG curve) is also plotted to make change in reduction rate during removing the solvent simple. In the bonding material using a solvent alone, an increase in the rate of vaporizing the solvent with an increase in the temperature can be confirmed (see FIG. 1).

In contrast, in the bonding material using a mixed solvent, temporary stagnation of increase in the vaporizing rate at about 120° C. can be confirmed (see FIG. 2). This shows that at about 120° C., vaporization of the solvent having a low boiling point in the mixed solvent is completed to some extent, and shifted to vaporization of the solvent having a high boiling point, of which the vaporizing rate is low. As described above, mixing of the low boiling point solvent and the high boiling point solvent can be confirmed by confirming the TG curve.

<Confirmation of Presence of Dispersant>

Since the content of the dispersant is low, quantitative confirmation is not easy. However, the presence of phosphorus can be confirmed by Inductively coupled plasma (ICP).

EXAMPLES

Hereinafter, the performance of the bonding material of the present invention will be described with reference to results of Examples.

<Preparation of Silver Nanoparticles>

Silver nanoparticles that were used in common to Examples were prepared as follows. As a reaction vessel, a 5-L reaction vessel was used. A stir stick equipped slats for stirring was placed on the center of the reaction vessel. A thermometer for monitoring the temperature was placed in the reaction vessel, and a nozzle was disposed so as to supply nitrogen to a solution from a lower portion thereof.

First, 3,400 g of water was placed in the reaction vessel, and nitrogen was supplied from the lower portion of the reaction vessel at a flow rate of 3,000 mL/min for 600 seconds to remove residual oxygen. Nitrogen was then supplied from an upper portion of the reaction vessel at a flow rate of 3,000 mL/min to form a nitrogen atmosphere in the reaction vessel. The temperature was adjusted with stirring so that the temperature of the solution in the reaction vessel was 60° C. 7 g of ammonia water containing 28% by mass of ammonia was placed in the reaction vessel, and the mixture was stirred for 1 minute until uniform.

Next, 45.5 g (molar ratio to silver: 1.98) of hexanoic acid (available from Wako Pure Chemical Industries, Ltd.) as a protective agent was added, and the mixture was stirred for 4 minutes to dissolve the protective agent. After that, 23.9 g (4.82 equivalent weight to silver) of aqueous solution of 50% by mass hydrazine hydrate (available from Otsuka Chemical Co., Ltd.) as a reductant was added, and the mixture was used as a reductant solution.

An aqueous solution of silver nitrate prepared by dissolving 33.8 g of silver nitrate crystals (available from Wako Pure Chemical Industries, Ltd.) in 180 g of water was prepared in a separate container and used as a silver salt aqueous solution. 0.00008 g (1 ppm relative to silver in terms of copper) of copper nitrate trihydrate (available from Wako Pure Chemical Industries, Ltd.) was further added to this silver salt aqueous solution.

This addition amount was an amount that could not be measured with a generally available weighing balance.

Therefore, the addition of copper nitrate trihydrate was achieved in such a manner that copper nitrate trihydrate aqueous solution with a rather high concentration was prepared and diluted, and the diluted solution was added so that a target addition amount of copper was added. The temperature of the silver salt aqueous solution was adjusted to 60° C. that was the same as in the reductant solution in the reaction vessel.

After that, the silver salt aqueous solution was added to the reductant solution at once, and the mixture was mixed to initiate a reduction reaction. At this time, change of color of the slurry terminated about 10 seconds after the initiation of the reduction reaction. The slurry was continuously stirred and aged for 10 minutes under stirring. After that, the stirring was stopped, and the slurry was subjected to solid-liquid separation by suction filtration, washed with pure water, and dried at 40° C. for 12 hours to obtain a powder of silver microparticles. The ratio of silver in the powder was calculated from a test of checking the residual amount by heating, and found to be 97% by mass. The remainder was considered to include hexanoic acid or a derivative thereof.

In Examples, Example in which as the protective agent, sorbic acid that was an unsaturated fatty acid was used, in addition to hexanoic acid that was saturated fatty acid, was employed. Specifically, a powder of silver microparticles was obtained in the same manner as in the case of using hexanoic acid except that 44.78 g of sorbic acid (available from Wako Pure Chemical Industries, Ltd.) was used as the protective agent in place of hexanoic acid and copper was not added in the preparation of silver nanoparticles. The ratio of silver in the powder was calculated to be 99% by mass. The rest was considered to include sorbic acid or a derivative thereof.

Example 1 and Comparative Example 1

The powder of silver nanoparticles coated with hexanoic acid, as obtained above, as silver nanoparticles having an average primary particle diameter of 20 nm, the powder of silver nanoparticles coated with sorbic acid, as obtained above, as silver nanoparticles having an average primary particle diameter of 110 nm, a powder of spherical silver particles 2-1C (available from DOWA Electronics Materials Co., Ltd.) (average particle diameter ($D_{50}$): 800 nm, when the particles were observed with a SEM, the particles in a visual field were each confirmed as an independent particle), octanol having a boiling point of 194° C. as a low boiling point solvent, isobornyl cyclohexanol (MTPH) having a boiling point of 318.3° C. as a high boiling point solvent, SOLPLUS D540 as a dispersant were mixed to obtain a bonding material having viscosity suitable for printing.

In Comparative Example, a powder of silver nanoparticles coated with hexanoic acid and having an average primary particle diameter of 60 nm was used in place of silver nanoparticles having an average primary particle diameter of 20 nm in the mixing, to produce a bonding material. The obtained bonding material was applied to a pure copper substrate by a printing method. The printing method was performed using a metal mask (mask thickness: 50 µm-thickness) and a metal squeegee by hand, as conditions at this time.

Using the bonding material of this Example, a test of bonding an oxygen-free copper substrate and a silicon chip was performed. The bonding material of the present invention was applied to a lower portion of metal piece, and the metal piece was disposed on the copper substrate. The oxygen-free copper substrate and the silicon chip was subjected to preliminary firing and heating as the first heating step at 100° C. for 30 minutes in a nitrogen atmosphere. The temperature was increased from 100° C. to a temperature in the second heating step (250° C.) at a temperature increasing rate of 0.3° C./s. After the temperature reached 250° C., a main firing step that was a one-hour second heating step was performed.

The obtained bonding layer was subjected to observation of a cross section with a SEM, evaluation of bonding strength, and evaluation by a reliability test. In this Example, the bonding layer having metal gloss and no irregular firing was obtained. Table 1 shows a state of a paste (viscosity suitable for printing), the resultant bonding strength, and the like. In Table, "o" represents a good state, "Δ" represents a slightly poor state, and "x" represents a poor state.

In Comparative Example in which silver nanoparticles having an average primary particle diameter of 20 nm were not contained in a bonding material, a void was generated and the bonding strength largely decreased. Accordingly, there was no need to perform the evaluation by the reliability test.

Comparative Examples 2 to 4

Bonding materials were prepared in the same manner as in Example 1 except that the low boiling point solvent was changed to terpineol having a boiling point of 217° C. (mixture of structural isomers/available from Wako Pure Chemical Industries, Ltd.) in Comparative Example 2, the low boiling point solvent was not used in Comparative Example 3, and the high boiling point solvent was not mixed in Comparative Example 4, in accordance with conditions shown in Table 1. The obtained results are also shown in Table 1.

As seen from comparison of Example 1 with Comparative Example 2, when the boiling point of the low boiling point solvent was 217° C. or higher, the strength largely decreased. In Comparative Example 3, since the low boiling point solvent is not contained in the bonding material, the viscosity of the paste largely increases, and the bonding material cannot be used as a bonding material suitable for printing. As seen from comparison of Example 1 with Comparative Example 4, when the high boiling point solvent was not contained, the strength was low, and a void was generated.

Comparative Example 5

A bonding material was prepared in the same manner as in Example 1 except that a dispersant was not mixed in accordance with the conditions shown in Table 1. The obtained results are also shown in Table 1. Silver particles were aggregated and hardened, and therefore, a paste itself could not be formed.

Comparative Example 6

A bonding material was prepared in the same manner as in Example 1 except that the total addition amount of the solvent and the dispersant was 7% by mass (the content of silver particles was 93% by mass) in accordance with the conditions shown in Table 1. The obtained results are also shown in Table 1. When the total addition amount of the solvent and the dispersant was higher than 5% by mass relative to the whole amount of the bonding material, that is, the content of silver particles was not 95% by mass or more, the paste state was good, a void was not generated, but the strength was considerably low.

Comparative Example 7

A bonding material was prepared in the same manner as in Example 1 except that as the dispersant, polyoxyethylene alkyl ether carboxylic acid (BEAULIGHT LCA-H available from Sanyo Chemical Industries, Ltd.), which had a carboxyl group, was mixed in accordance with the conditions shown in Table 1. The obtained results are also shown in Table 1. Since the dispersant had no phosphate group, the dispersing power was insufficient in an increase in silver concentration. In the paste state, the viscosity was not suitable for printing. Therefore, the bonding material could not be used as a bonding material suitable for printing.

Comparative Examples 8 and 9

A bonding material was prepared in the same manner as in Example 1 except that the addition amount of silver nanoparticles having an average primary particle diameter of 20 nm was 5% by mass or 45% by mass in accordance with the conditions shown in Table 1. The obtained results are also shown in Table 1. When the addition amount of silver nanoparticles of 20 nm was 5% by mass (Comparative Example 8), the paste state was good, but the silver nanoparticles did not sufficiently have an action of good bonding property, and the strength decreased. When the addition amount of silver nanoparticles of 20 nm was 45% by mass (Comparative Example 9), a defect of insufficient strength of the silver nanoparticles was remarkable. Further, the amount of secondary silver nanoparticles having a larger particle diameter decreased, and the strength was insufficient. Therefore, the viscosity was not suitable for printing, and the bonding material could not be used as a bonding material suitable for printing.

Example 2 and Comparative Examples 10 and 11

A bonding material was prepared in the same manner as in Example 1 except that the ratio of the amount of the low boiling point solvent to the amount of the high boiling point solvent was 1:1 in Example 2, 5:3 in Comparative Example 10, and 1:3 in Comparative Example 11, in accordance with the conditions shown in Table 1. The obtained results are also shown in Table 1.

In Example 1, the ratio of the amount of the low boiling point solvent to the amount of the high boiling point solvent was 3:5. In Comparative Example 10 in which the ratio of the amount of the low boiling point solvent was more than half, the paste state was good, a void was not generated, but the advantage of the high boiling point solvent decreased. Therefore, it was found that the strength decreased. In Comparative Example 11 in which the ratio of the amount of the low boiling point solvent to the amount of the high boiling point solvent was lower than a range 3:5 to 1:1, a paste suitable for printing was not obtained, and this was not suitable.

Example 3

A bonding material was prepared in the same manner as in Example 1 except that hexyl diglycol (HeDG) having a boiling point of 260° C. was used as a different high boiling point solvent. The obtained results are also shown in Table 1. The paste state, the generation situation of void, the initial bonding strength, and the reliability strength were all good, like in Example 1.

TABLE 1

| | BONDING MATERIAL COMPOSITION RATIO (% BY MASS) | | | | | | | | | PASTE STATE | | | |
|---|---|---|---|---|---|---|---|---|---|---|---|---|---|
| | SILVER NANOPARTICLES | | | LOW BOILNG POINT | | HIGH BOILING POINT | | DISPERSANT | | (VISCOSITY SUITABLE FOR PRINTING) | VOID | INITIAL STRENGTH [MPa] | RELIABILITY STRENGTH [MPa] |
| | HEXANOIC ACID | SORBIC ACID | MICRON | OCTANOL | TERPINEOL | MTPH | HeDG | PLUS D540 | LCA-H | | | | |
| | 20 nm | 60 nm | 110 nm | PARTICLES | (194° C.) | (217° C.) | (>260° C.) | (260° C.) | | | | | | |
| EXAMPLE 1 | 30 | — | 50 | 15 | 1.5 | — | 2.5 | — | 1 | — | ○ | ○ | 24 | 24 |
| EXAMPLE 2 | 30 | — | 50 | 15 | 2 | — | 2 | — | 1 | — | ○ | ○ | 26 | 24 |
| EXAMPLE 3 | 30 | — | 50 | 15 | 2 | — | — | 2 | 1 | — | ○ | ○ | 19 | 21 |
| COMPARATIVE EXAMPLE 1 | — | 30 | 50 | 15 | 1.5 | — | 2.5 | — | 1 | — | ○ | Δ | 4 | — |
| COMPARATIVE EXAMPLE 2 | 30 | — | 50 | 15 | — | 1.5 | 2.5 | — | 1 | — | ○ | ○ | 8.8 | — |
| COMPARATIVE EXAMPLE 3 | 30 | — | 50 | 15 | — | — | 4 | — | 1 | — | x | — | — | — |
| COMPARATIVE EXAMPLE 4 | 30 | — | 50 | 15 | 4 | — | — | — | 1 | — | ○ | Δ | 9.9 | — |
| COMPARATIVE EXAMPLE 5 | 30 | — | 50 | 15 | 1.9 | — | 3.1 | — | — | — | x | — | — | — |
| COMPAR- | 29.4 | — | 48.9 | 14.7 | 2.25 | — | 3.75 | — | 1 | — | ○ | ○ | 6 | — |

TABLE 1-continued

| | BONDING MATERIAL COMPOSITION RATIO (% BY MASS) | | | | | | | | | PASTE STATE | | | |
|---|---|---|---|---|---|---|---|---|---|---|---|---|---|
| | SILVER NANOPARTICLES | | | LOW BOILNG POINT | | HIGH BOILING POINT | | DISPERSANT | | (VISCOSITY SUITABLE FOR PRINTING) | VOID | INITIAL STRENGTH [MPa] | RELIABILITY STRENGTH [MPa] |
| | HEXANOIC ACID 20 nm | SORBIC ACID 60 nm | MICRON 110 nm | OCTANOL PARTICLES | TERPINEOL (194° C.) | MTPH (>260° C.) | HeDG (260° C.) | PLUS D540 | LCA-H | | | | |
| COMPARATIVE EXAMPLE 6 | | | | | (217° C.) | | | | | | | | |
| COMPARATIVE EXAMPLE 7 | 30 | — | 50 | 15 | 1.5 | — | 2.5 | — | — | 1 | x | — | — |
| COMPARATIVE EXAMPLE 8 | 5 | — | 75 | 15 | 1.5 | — | 2.5 | — | 1 | — | ○ | ○ | 8 | — |
| COMPARATIVE EXAMPLE 9 | 45 | — | 35 | 15 | 1.5 | — | 2.5 | — | 1 | — | x | — | — |
| COMPARATIVE EXAMPLE 10 | 30 | — | 50 | 15 | 2.5 | — | 1.5 | — | 1 | — | ○ | ○ | 15 | 8 |
| COMPARATIVE EXAMPLE 11 | 30 | — | 50 | 15 | 1 | — | 3 | — | 1 | — | x | — | — |

INDUSTRIAL APPLICABILITY

The bonding material according to the present invention can be applied to a non-insulated type semiconductor device and a bear chip mounting-assembling technology and can also be applied to a bonding step during production of a power device (rectifier diodes, power transistors, power MOSFETs, insulated-gate bipolar transistors, thyristors, gate turn-off thyristors, and triacs). The bonding material can also be used as a bonding material for glass having a chromium-treated surface and can also be used as a bonding material for an electrode and a frame of a lighting device using an LED.

The invention claimed is:
1. A bonding material comprising:
silver nanoparticles coated with an organic substance having 6 or less carbon atoms and having an average primary particle diameter of 10 to 30 nm as main silver particles;
silver nanoparticles coated with an organic substance having 6 or less carbon atoms and having an average primary particle diameter of 100 to 200 nm as secondary silver particles;
submicron silver particles having an average primary particle diameter of 0.3 to 3.0 μm;
two kinds of solvents having different boiling points, wherein a solvent having a lower boiling point among the two kinds of solvents is at least one solvent selected from butanol, octanol, α-pinene, xylene, and acetylacetone, and a solvent having a higher boiling point among the two kinds of solvents has a boiling point of 230° C. to 320° C. and is at least one solvent selected from alcohol, polyol, and glycol ether; and
a dispersant having a phosphate group,
wherein the content of silver particles including the main silver particles, the secondary silver particles, and the submicron silver particles in the bonding material is 90% by mass or more.

2. The bonding material according to claim 1, wherein a total amount of the solvents and the dispersant is 5% by mass or less relative to a whole amount of the bonding material.

3. The bonding material according to claim 1, wherein the organic substance having 6 or less carbon atoms that coats the main silver particles is hexanoic acid.

4. The bonding material according to claim 1, wherein the main silver particles are contained in an amount of 10 to 40% by mass relative to a whole amount of the bonding material.

5. The bonding material according to claim 1, wherein a content ratio of a solvent having a lower boiling point to a solvent having a higher boiling point among the two kinds of solvents is 3:5 to 1:1.

6. The bonding material according to claim 1, wherein the solvent having a higher boiling point is at least one solvent selected from dodecanol, 2-ethyl-1,3-hexanediol, diethylene glycol monobutyl ether acetate, dibutyl diglycol, hexyl diglycol, 2-ethylhexyl diglycol, and isobornyl cyclohexanol.

7. A bonding method comprising:
a step of applying the bonding material according to claim 1 to surfaces to be bonded of materials to be bonded;
a first heating step of retaining the materials to be bonded under an environment of 80 to 120° C. for 30 to 60 minutes without application of pressure to the surfaces to be bonded; and
a second heating step of retaining the materials to be bonded under an environment of 250° C. for 30 to 60 minutes.

8. The bonding material according to claim 1, wherein the content of the silver particles in the bonding material is 92% by mass or more.

* * * * *